July 30, 1935.        G. G. HEGHINIAN        2,009,886
PROCESS FOR PREPARING PAVING MATERIALS
Filed Feb. 8, 1930
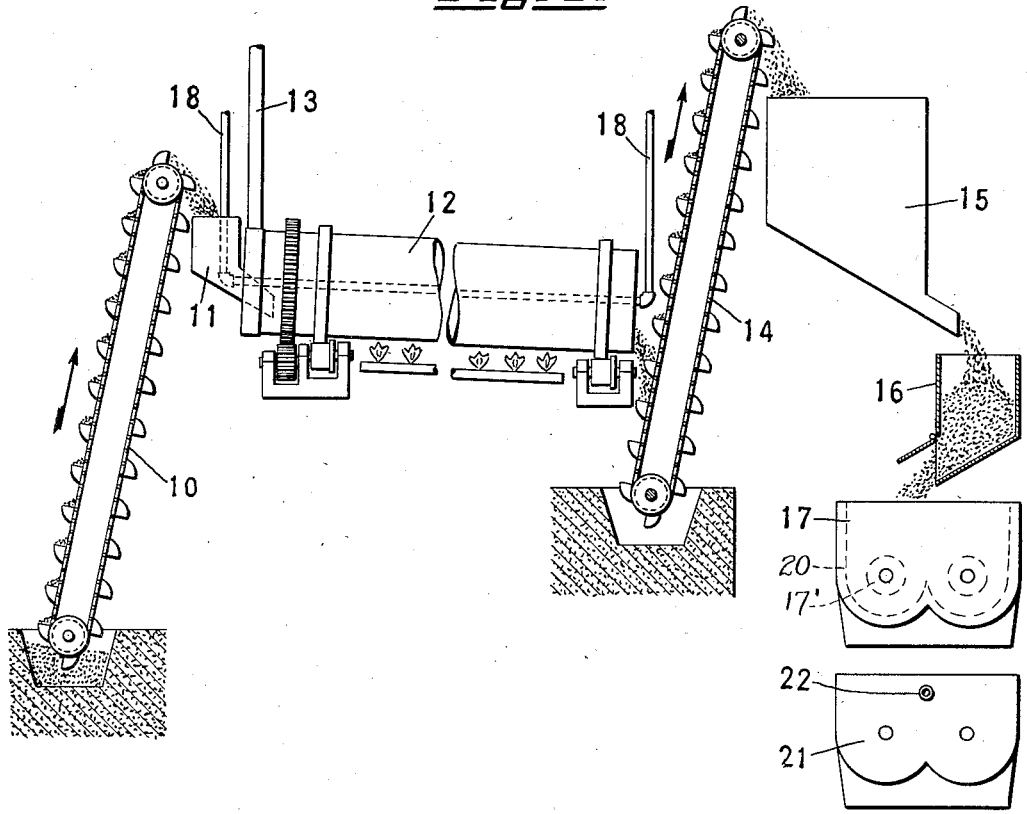
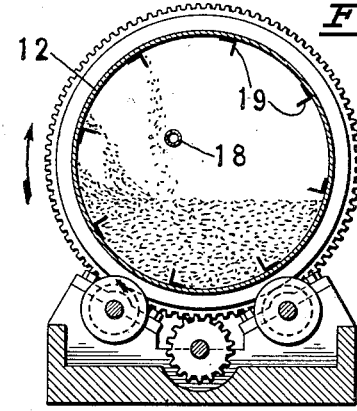
INVENTOR
G. G. Heghinian,
BY
ATTORNEY Patented July 30, 1935

2,009,886

UNITED STATES PATENT OFFICE 2,009,886

PROCESS FOR PREPARING PAVING MATERIALS

Garabed G. Heghinian, Baltimore, Md.

Application February 8, 1930, Serial No. 426,873

6 Claims. (Cl. 106—31)

This invention relates to a method for obtaining a better asphalt paving and surfacing material and has for its object to obtain such product from the use of cheaper materials than are customarily used.

Another object is to provide a method for better intermixing granular materials with asphalt.

A further object is to reduce the amount of dust heretofore generally discharged from an asphalt paving plant.

It has heretofore been the custom to use only clean sand and crushed stone for intermixture with asphalt in the production of a sheet surfacing or top coat for paving material because the presence of clay or loam in the sand has lessened the ability of the material to mix with asphalt. The exact cause of the dirty granular material not mixing well with asphalt has not been fully appreciated. Moisture is a common cause of asphalt failing to unite with any material because the asphalt seems to have a strong aversion to anything wet. It has been customary to remove particles of moisture from the granular material by heating the same to above the boiling point of water before mixing with the asphalt both for the purpose of removing any moisture and to avoid chilling the asphalt.

It has generally been supposed moisture will have a detrimental effect upon the quality of the usual asphalt mixture.

It has been discovered that dust particles formed in the drier is one cause of unsatisfactory mixture with asphalt especially when the granular material is combined with any clay or ordinary loam. This dust on the granular particles prevents a good intermixture with asphalt possibly for somewhat the same reason that dust or powder is generally used to prevent anything adhering to asphalt, just as it is common to use a dust spread over the surface of a newly laid sheet of asphalt paving. Contrary to what might be expected it has been discovered that a slight amount of moisture in the drier will allay the dust formation and not impede but will facilitate the intermixture of the asphalt when no excess moisture is used for the reason that the asphalt apparently more thoroughly intermixes with all the particles and appears to thoroughly impregnate not only the granular sand and crushed stone particles but also the pulverulent particles of loam or clay impurities. Therefore it is possible under these conditions to use cheaper grades of sand and crushed stone since a higher than usual content of loam or clay is permissible.

Referring to the drawing:

Fig. 1 is a line diagram of an asphalt plant arranged to carry out the present invention.

Fig. 2 is a transverse section through the drier.

Some customary form of conveyor or elevator 10 is used to supply sand, crushed stone and the like to the hopper 11 of the usual inclined rotary drier 12.

According to the usual practice this drier is heated by an oil flame or other convenient means 16 for raising the temperature of the granular material substantially above the boiling point of water about or over 350° F. before it is mixed with the asphalt. Ordinarily there is considerable dust formed in the drier 12 which is carried off for discharge into the atmosphere through the smoke stack 13 connected to the upper end of the drier. The hot material discharged from the drier is carried by the conveyor 14 to the usual hot bin 15 where it may be sorted and stored. Located below the hot bin 15 is the mechanical mixing tank 17 into which the granular material is discharged for mixing with the hot asphalt. There is usually provided a weighing box 16 between the bin 15 and the tank 17 so that measured quantities of granular material may be supplied for mixture with a measured amount of asphalt.

Unlike the usual asphalt plant a water pipe 18 extends longitudinally into and through the drier and is perforated so that water may be sprayed upon the hot granular material to allay the dust in the drier. As shown in Fig. 2 the drier is usually provided on the inside with longitudinal lifting vanes 19 and the water pipe 18 is preferably laterally displaced from the longitudinal axis of the drier toward the path of the falling material which is carried up by these lifting vanes so as to more intimately mix the moisture and material.

The drier is rotated in the usual manner which need not be referred to. Under the present invention the hot material leaves the drier, after having been moistened, at a temperature of about 200° F. to 210° F. so that the amount of dust generally formed is substantially reduced without there being an excess of moisture in the granular material which might impede its subsequent mixture with asphalt.

To enhance the mechanical mixing operation in the tank 17, such tank is generally provided with agitating vanes 17' but in addition heat is gently applied preferably by means of a jacket forming a space 20 through which an oil, for example, heated to about 350° F. is circulated so that the asphalt mixture is heated to between about 225° F. to 250° F. in the tank 17. After being thoroughly mixed the material may be then discharged into a wagon or car for delivery where needed but it is preferably discharged into a second mixing tank 21 where it may be cooled by the water or air spray pipe 22 for storing until such time as it may be desired for use. This ability of the loose, cold material to be stored and form an adherent mass upon application of pressure enables the plant to be run for the production of the surfacing asphaltic material at times when demand is not heavy and the top or sealing coat of asphalt material for paving can be stored until used. This enables the plant to operate during periods of heavy demand on the production of asphaltic materials for the binder course using larger sizes of broken stone and gravel than is permissible in the top or surfacing course, and without the necessity of having a separate plant for the production of the top coat and without the necessity of stopping production of the binder material to provide the sealing course in hot condition.

The sealing course for asphaltic pavement may under this invention be heated although such is not necessary since it can be satisfactorily put in place on the job by the application of pressure alone without heat.

In using the apparatus of this invention for the production of the binder course in asphalt paving, the water spray within the drier may function in substantially the same manner as when operating for the production of the top coat. However in producing the binder course, since the material contains less asphalt than the top course it should be sent from the mixer direct to the job in a heated condition and therefore the cooling mixer 21 need not be used in the production binder material and such material for the binder course will be discharged from the mixing tank 17 directly into the wagons or cars in which it is to be hauled to the job.

This invention also practically does away with the objectionable dust ordinarily given off from a drier into the outside air. Also the excessive dust formerly present in the drier formed a sort of coating or partition of dust on the sand and stone which prevented the asphalt from adhering. This has now been overcome since the asphaltic composition (or the like) penetrates the entire mass and unites all the particles, small and large.

Another objection to the old practice was the formation of lumps by the clay and loam, which lumps would not be penetrated by the asphalt and the asphalt would only coat them with the result that when laid as paving these lumps would become crushed under traffic and the crushed loosened particles would be washed away by rain leaving small holes in the paving. This last objection has now been removed by the present invention since the adherent dust particles are not formed when moisture is introduced into the drier. Heretofore the clay and loam content has been necessarily kept below 10% but now since the objections to such clay and loam have been so far reduced, as much as 30% to 40% clay or loam may be present with better results than were previously attainable with less than 10% clay or loam. In this way cheaper materials may be used and thus a satisfactory product cheapened in cost.

It may be desirable to have the elevator 14 discharge into a revolving screen having different sizes of openings so that as the material passes through it is sorted and deposited into different sections within the hot bin 15 and from these different sections material of various sizes can be drawn as desired for discharge into the weighing box 16.

As used in the claims the term "clay" includes clay or loam or the like or a mixture of these.

I claim:

1. In the process of preparing a paving surface mixture of asphalt and granular material which comprises heating and agitating the granular material and then mixing the hot granular material with hot asphalt, the novel steps which include improving the quality of the mixture by wetting the hot granular material while agitating the same and before adding the asphalt enough to allay the dust and less than enough to interfere with its inter-mixture with the hot asphalt, heating the asphalt and granular material during a mechanical mixing operation, and subsequently transferring the mixture for further mechanical mixing accompanied by cooling.

2. The process of preparing a paving mixture of asphalt and granular material, containing considerable loam or clay which comprises wetting the granular material containing loam or clay by spraying water on it while it is heated and agitated in a dryer, then conveying same into a mixer where hot asphalt is added and heating and mixing continued further.

3. A process of preparing an asphaltic paving material which comprises wetting, agitating and heating below 212° F. a granular mineral aggregate, containing less than 41% clay or loam, then transferring same into a mixer and adding hot asphalt and mixing and heating further.

4. A process of preparing a paving mixture of asphalt and granular material containing less than 41% loam or clay, which comprises agitating, heating and wetting the granular material then adding hot asphalt and mixing and heating further.

5. A process of preparing a paving material, which comprises wetting, agitating and heating a granular material containing some loam or clay, and incorporating with asphalt in a mixer and heating while mixing, then discharging same into a second mixer where it is cooled by water or air spray.

6. A process of preparing an asphaltic paving material with granular aggregate containing less than 41% loam or clay, comprising spraying water, agitating and heating below 212° F. then adding asphalt at a temperature about 240° F. and mixing further in presence of heat.

GARABED G. HEGHINIAN.